United States Patent Office 3,007,882
Patented Nov. 7, 1961

3,007,882
METHOD OF PRODUCING SHAPED BODIES OF CERAMIC MATERIAL PROTECTIVE AGAINST IONISING RADIATION
Vladimír Lach, 956 Heralecka, Prague, Vladimír Potuček, 5 Hostivarska, Prague-Hostivar, and Jaroslav Slaba, 30 Vodickova, Prague, Czechoslovakia
No Drawing. Filed Dec. 12, 1957, Ser. No. 702,487
2 Claims. (Cl. 252—478)

Protective materials against ionising radiation may be made from waste materials, or partially waste materials, or materials which can be further processed only with considerable difficulty, obtained in the extraction of lead from its ores or from lead processing plants and containing in whatever combination the elements Pb, Fe, Sn, Si, Ca, Sb, As, Mn, Mg, Al, W, Cr, Cu, Zn, Na, Ag, Ni, Cd, Li, Ti either in elementary form, but predominantly in the form of compounds such as oxides or sulphides or more complex compounds, in combination with various carrier media of inorganic or organic nature, that can be worked either in a hot or cold condition and if necessary, with the application of pressure.

Protective plasterings for X-ray and radiological working rooms, in which plasterings the above stated materials are used as an absorbent, are not only capable of replacing fully the conventional baryte plasterings, but in addition enable a reduction in the consumption of carrier media and the total weight of the building structure. However, the application of the materials in question in the the form of plasterings is not an ideal solution of the technical problem involved, as it is dependent to a great extent on individual manual labour, which does not guarantee a sufficient homogeneity of the absorption material. It is necessary therefore the object of the invention to find a carrier material which in technical respects would be more satisfactory and would enable to bind a high proportion of the absorbent so as to obtain a high efficiency with low total weight of the material. It is also desirable for the material to have a high homogeneity and eveness, securing precise values of the lead equivalent required.

To this end, protective coverings, such as wall tiles or plates of various shape, are manufactured according to the present invention in such a manner that the mentioned radiation absorbing waste materials are combined with aluminium silicates as a carrier material. The resulting mixture is shaped and fired. The main advantage and the main feature of this invention consists in that the radiation absorption material in its reaction with the aluminium silicates participates actively in the formation of a ceramic mass. Consequently, the carrier medium loses during the manufacturing process its prevailing character of a carrier and becomes in fact a radiation absorbing material. This fact has been proved by thorough tests, showing the ceramic coverings to be a fully homogeneous absorption material. A further advantage of this manufacturing method is that a high proportion, even more than 90 percent, of absorption material may be used in the preparation of these coverings, whereby a very high lead equivalent is obtained, without affecting the quality of the product as far as its appearance and mechanical strength are concerned.

The foregoing statements demonstrate the important role of aluminium silicates, such as ceramic clays of suitable composition, as a carrier medium. If clay is used as a starting material it must have a certain chemical composition, as it participates in a solid state in a reaction with the added radiation absorbent material. Strengthening of the product is brought about by the usual ceramic methods, e.g. by firing in conventional ceramic furnaces at a determined temperature. In view of the heterogeneous composition of the mixture the degree of firing plays an important part for ensuring an adequate strengthening of the final product and for imparting to it the desired properties (shape, straightness of edges and faces, etc.).

Moreover, on the chemical composition and on the proportion of the radiation absorbing material depends the perfection of the final appearance of the product having a high lead equivalent. Thorough tests have shown that the ratio between aluminium oxide, silicon oxide and the oxides of the remaining elements ought to be maintained within the following limits, expressed in mols:

$$6.0\text{–}9.5(PbO.R_2O_3).1Al_2O_3.2.0\text{–}2.8SiO_2$$

in which $R_2O_3$ represents the active oxides: $Sb_2O_3$, $Fe_2O_3$, $As_2O_3$. Although these elements may also occur in elementary form or in other compounds, they are considered in the above formula as oxides to express the desired mixing ratio.

In those cases where the absorbent is not plastic at all, the carrier must have a certain plasticity. This involves the capacity of the carrier material to bind the absorbent and to form therewith a plastic mass, that is a plastic mixture capable of being moulded. On the plasticity of the prepared mixture depends its capacity to be moulded, and the strength of the product in a raw state, so that it can be manipulated as required. The material according to the present invention fully complies with these requirements, as plasticity is an outstanding quality of aqueous aluminium silicates, i.e. clays. In the following examples of materials according to the invention, JJ-dusts and arsenic dusts were used.

*Examples*

| Mixture No. | 1 | 2 | 3 |
|---|---|---|---|
| Mixing ratio parts by weight (p.b.w.). | 90 p.b.w. JJ-dust. 10 p.b.w. binding agent. | 44 p.b.w. JJ-dust. 36 p.b.w. arsenic dust. 20 p.b.w. binding agent. | 90 p.b.w. arsenic dust. 10 p.b.w. binding agent. |
| Calcination temperature, ° C | 600 | 640 | 690. |
| Hygroscopicity, percent | 8 | 12 | 14. |
| Volumetric weight, gr./ccm | 4.8 | 3.61 | 2.89. |
| Shrinkage | 2.1 | 0.9 | 1.1. |
| Appearance | very good | very good | very good. |
| Strength | good | good | good. |
| Lead equivalent (mm. Pb) at 150 kv. | 2.78 | 1.98 | 1.17. |
| Thickness of plate, mm | 10 | 10 | 10. |

JJ-dust is a conventional term employed for the lead fumes produced in the roasting of lead ores. These fumes contain lead in amounts of 85% or more, expressed as PbO.

The wall tiles or plates manufactured according to the present invention may have a glazing or a layer of plastic material applied on their surface.

A wall may be formed from such plates so that the edge of one plate overlaps the edge of an adjacent plate, the edges being so shaped that the wall has uniform thickness throughout.

Various combinations of absorbents with the carrier medium may be used for producing coating materials and tiles which have absorption properties against ionising radiation, and the required lead equivalent, so that they can be employed as a protective material for medical X-ray rooms and technical radiological working rooms.

What we claim is:
1. A method of producing shaped bodies of ceramic materials protective against ionizing radiation, comprising the steps of mixing a waste material selected from the group consisting of lead extraction and lead processing wastes and mixtures thereof with an aqueous aluminum silicate in such quantities as to produce a plastic mixture containing between 6.0 and 9.5 molar parts of a radiation-absorbing oxide selected from the group consisting of lead monoxide, arsenic trioxide, and mixtures of said oxides, 2.0 to 2.8 molar parts of silicon dioxide, and one molar part of aluminum oxide, shaping the mixture, and firing the shaped bodies so produced at a temperature substantially between 600° and 690° C.

2. A method of producing shaped bodies of ceramic materials protective against ionizing radiation, comprising the steps of mixing a lead-bearing waste material selected from the group of lead extraction and lead processing wastes and mixtures thereof with an aqueous aluminum silicate in such quantities as to produce a plastic mixture containing between 6.0 and 9.5 molar parts of lead monoxide, 2.0 to 2.8 molar parts of silicon dioxide, and one molar part of aluminum oxide, shaping the mixture obtained, and firing the shaped bodies so produced at a temperature substantially between 600° and 690° C.

References Cited in the file of this patent

UNITED STATES PATENTS

| | | |
|---|---|---|
| 2,018,600 | Brown | Oct. 22, 1935 |
| 2,197,604 | Barton | Apr. 16, 1940 |
| 2,858,451 | Silversher | Oct. 28, 1958 |